United States Patent [19]

Sullivan et al.

[11] Patent Number: 4,930,111
[45] Date of Patent: May 29, 1990

[54] OVERLAP CORRELATOR SYNTHETIC APERTURE PROCESSOR

[75] Inventors: Edmund J. Sullivan, Portsmouth, R.I.; Stergios Stergiopoulos, Athens, Greece

[73] Assignee: The United States of America as represented by the Secretary of the Navy, Washington, D.C.

[21] Appl. No.: 374,679

[22] Filed: Jun. 30, 1989

[51] Int. Cl.$^5$ ............................................. G01S 3/80
[52] U.S. Cl. .................................... 367/130; 367/106
[58] Field of Search ................ 367/130, 124, 129, 7, 367/153, 108, 88; 342/25

[56] References Cited

U.S. PATENT DOCUMENTS 3,895,381  7/1975  Kock ..................................... 367/104
4,088,978  5/1978  Gilmour ................................. 367/88

OTHER PUBLICATIONS

Williams, R. E., "Creating an Acoustic Synthetic Aperture in the Ocean," Journal of the Acoust. Soc. of America, vol. 60, pp. 60-73, 1976.

Brook, H. W., "Temporal and Spatial Fluctuations in Single-Path Underwater . . . " Journal Acoust. Soc. America, vol. 72, 1982.

Koenigs, P. D. et al., "A Further Study of the Space and Time Stability of a Narrow Band Acoustic Signal . . . " Nusc. Tech. Document, #6605,21, Dec. 1981.

Primary Examiner—Ian J. Lobo
Attorney, Agent, or Firm—Michael J. McGowan; Prithvi C. Lall

[57] ABSTRACT

A means for extending the useful aperture of a multi-hydrophone towed array by using the overlap of the successive positions of the array hydrophones as the array moves forward through the water. The overlap information is used by an overlap correlator to provide phase correction factors for a synthetic aperture signal processing scheme. The overlap correlator continues to refine the correction factors using later in time hydrophone measurement data.

3 Claims, 4 Drawing Sheets

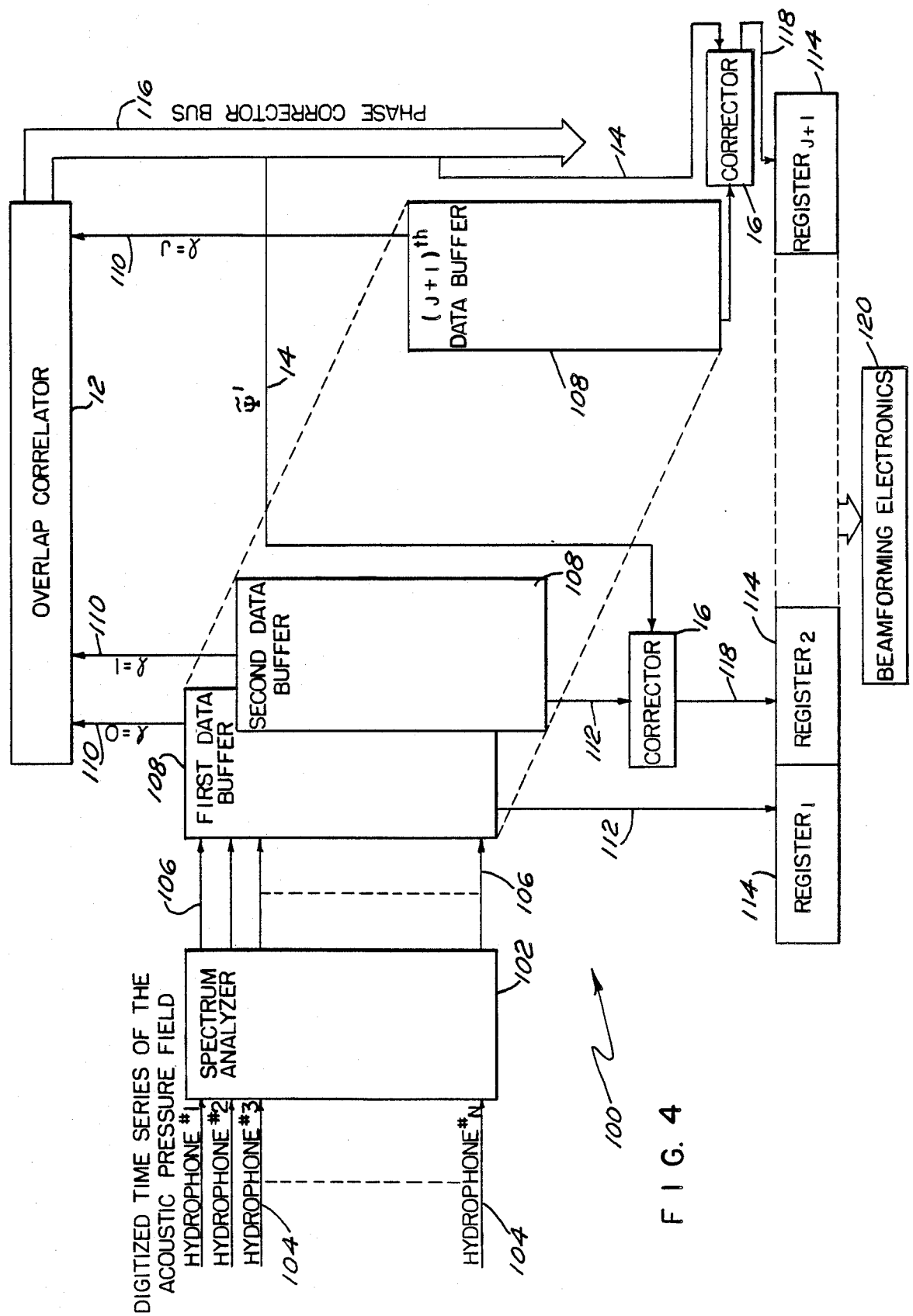
F I G. 4

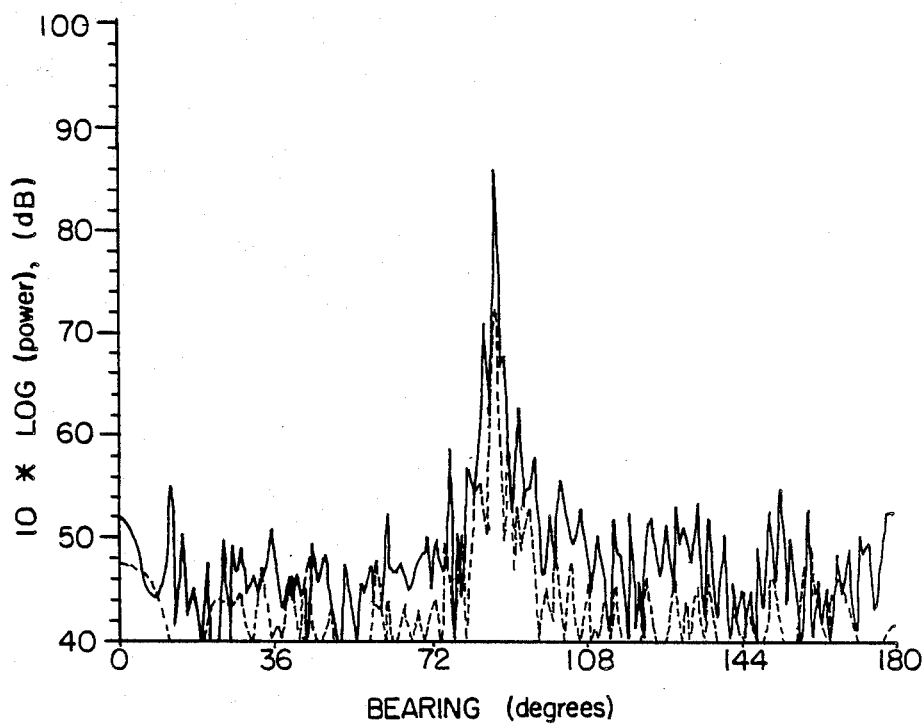
F I G. 7
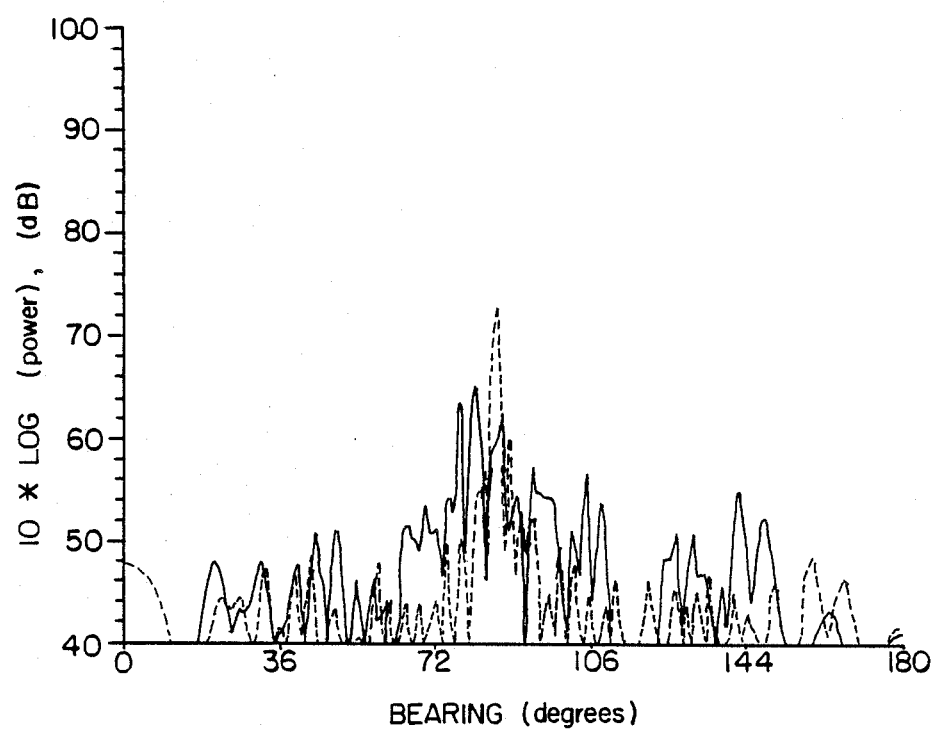
F I G. 8

OVERLAP CORRELATOR SYNTHETIC APERTURE PROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to towed array signal processing and more particularly to a means for extending the physical aperture of an array of hydrophones by exploiting the movement of this array during an observation period such that the effective aperture is equivalent to that of a longer, fully populated array having length equal to the distance travelled by the moving array during this observation period, such means using a novel, overlap correlator based, synthetic aperture signal processing technique.

(2) Description of the Prior Art

A continuing goal of sonar system designs in general is to increase the detection range. Towed array type sonar systems were introduced because they permitted listening at lower frequencies which in turn provided greater detection ranges. Since the low frequency regime included substantial traffic noise however, very high bearing resolution was required in order to permit angular separation of closely spaced sources, especially while operating in an environment having very high traffic density. This requirement for providing higher bearing resolution at low frequencies lead to development and use of longer towed hydrophone arrays. Use of longer arrays however had serious, undesirable technical and operational implications. In order to avoid physical extension of towed arrays, many attempts were made to increase the effective length of a given array by synthesizing additional hydrophones. Such attempts included application of aircraft and satellite active radar system synthetic aperture techniques. The results of these attempted applications to sonar systems were not successful however due to the presence of disturbed motion of the towed array caused by currents and also due to lower coherence of acoustic signals in seawater as compared to the coherence of electromagnetic waves in the air.

More recent experimental studies, (WILLIAMS, R. E., Creating an Acoustic Synthetic Aperture in the Ocean, Journal of the Acoustical Society of America, 1976, Vol.60, pp 60-73; BROEK, H. W., Temporal and Spatial Fluctuations in Single-path Underwater Acoustic Wave Fronts, Transmission from the First Convergence Zone at 43-nmi Range, Journal of the Acoustical Society of America, 1982, Vol.72, pp 1527-1532; and KOENIGS, P. D. et al, A Further Study of the Space and Time Stability of a Narrowband Acoustic Signal in the Ocean, Short Range Results, Presented at the 102Hnd Meeting of the Journal of the Acoustical Society of America, Dec. 1, 1981, Miami Beach, Fla.) NUSC Technical Document 6605,21 Dec. 1981, however, indicated that the space and time coherence of the acoustic signal in the sea appears to be sufficient to synthetically extend the physical aperture of a Moving Towed Array (MTA). Unfortunately, the approach used in what is now the "standard" synthetic aperture technique requires a highly accurate a prior knowledge of the source frequency. In addition, even when the source frequency is known, processing still suffers degradation due to random array motion and anomalies in the propagation medium. What is needed is a means for extending the effective aperture of an array beyond its physical aperture without having to contend with the above limitations.

SUMMARY OF THE INVENTION

Accordingly, it is a general purpose and object of the present invention to provide a means for extending the apparent aperture of a towed hydrophone array using synthetic aperture signal processing techniques.

It is a further object that such means utilize a phase correction technique in combination with the synthetic aperture signal processing.

Another object is that such technique not require a highly accurate estimate of source frequency.

Still another object is that such technique exploit the existing physical aperture of the array itself to obtain the phase correction factor estimate.

These objects are accomplished with the present invention by providing a means for extending the useful aperture of a towed hydrophone array by using the overlap of successive positions of the array as it moves forward to produce the phase corrections for combining with the synthetic aperture scheme. A plurality of phase correction factor estimators continue to refine the correction factor using measurements taken later in time.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 4 shows a block diagram of the overlap correlator synthetic array processor of the present invention.

FIG. 7 shows the bearing estimate of a vessel which is obtained from the beamforming of 512 synthesized hydrophones derived from a 32 hydrophone array by using the ETAM algorithym, and for comparison, the bearing estimate from an actual 64 physical hydrophone array.

FIG. 8 shows the beamforming of 64 synthesized hydrophones derived from an 8 hydrophone array by using the standard synthetic aperture technique, and for comparison, the bearing estimate from an actual 64 physical hydrophone array.

DESCRIPTION OF THE PREFERRED EMBODIMENT

Prospects for successfully extending the physical aperture of a towed array require signal processing techniques which differ from the synthetic aperture approaches used in active radars and standard synthetic aperture arrays. This was pointed out in AUTREY, S. W., Passive Synthetic Arrays, Journal of the Acoustical Society of America (JASA), 1988, Vol. 84, pp 592-598. In our publication, STERGIOPOULOS, S. and SULLIVAN. E. J., Extended Towed Array Processing by An Overlap Correlator, Journal of the Acoustical Society of America (JASA), 1989, Vol. 86, pp 158-171, we introduced an algorithm for Extended Towed Array Measurements (ETAM) that achieves a predetermined aperture size using an N hydrophone MTA. The key element in this algorithm is a phase correction factor that is used to coherently combine successive measurements of the moving towed array in order to extend the effective towed array length. The phase correction factor is derived by cross-correlating successive signals of the array hydrophones that overlap. Because of the spatial overlapping, the algorithm can compensate for the phase fluctuations of the received signal caused by irregularities of the tow path of the physical array and also by acoustic propagation characteristic effects. As a result of this continuous compensation it is not necessary to have accurate estimates of the source frequency or to perform a maneuver in order to obtain a wavenumber or a bearing estimate as is required by presently used passive synthetic aperture techniques.

Figure 1:
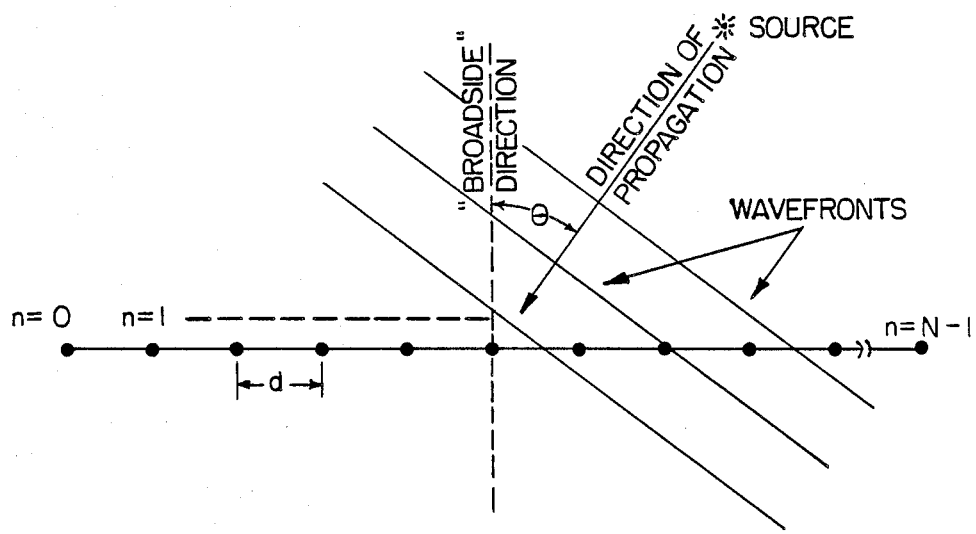
FIG. 1 shows a top view of a typical prior art towed array of N elements passing through an acoustic field.

FIG. 1 shows a top view of a typical prior art towed array of N elements passing through an acoustic field. It is noted that use of a beamforming technique is necessary in order to derive bearing estimates from the synthesized towed array measurements generated by the ETAM algorithm. As we have shown in our above cited paper, the best beamforming technique for recovering the inherent bearing information from extended towed array measurements is the Conventional Beamformer (CDF), which is the optimum estimator for the problem of a single source in white noise. In other words, if bearing ($\theta$, i.e., the angle of the source from a normal to the array) is desired, the phases $\Phi_n$ of the receiver hydrophone outputs are selected to provide a maximum output when the receiver outputs are summed together. This process is called beamforming and is defined by, $$P_{cbf}(\theta) = d_n^+(\theta) R_{yy} d_n(\theta) \quad (1)$$

where $d_n(\theta) = exp(i\Phi_n)$ is the direction vector, $$\Phi_n = \frac{\omega}{C} d(n-1) \sin\theta$$

is the phase required by the $n^{th}$ hydrophone for a given angle $\theta$, $R_{yy}$ is the cross correlation matrix of the space samples $Y_n(\omega)$ in the frequency domain, $\omega$ is the frequency of the source, "d" is the spacing between the hydrophone elements, "C" is the speed of sound in the sea, $\theta$ is the bearing angle and "n" refers to the $n^{th}$ hydrophone of the tower array. The angle $\theta$ of the incoming plane waves of the source signal can then be computed by searching for the maximum value of $P_{cbf}(\theta)$ as defined above. The precision of the measurements is related to the length or aperture of the array. Longer arrays give a narrower angular response to the source signal, and therefore a more precise measurement. This response as a function of angle is commonly called the "beam pattern".

Figure 2:
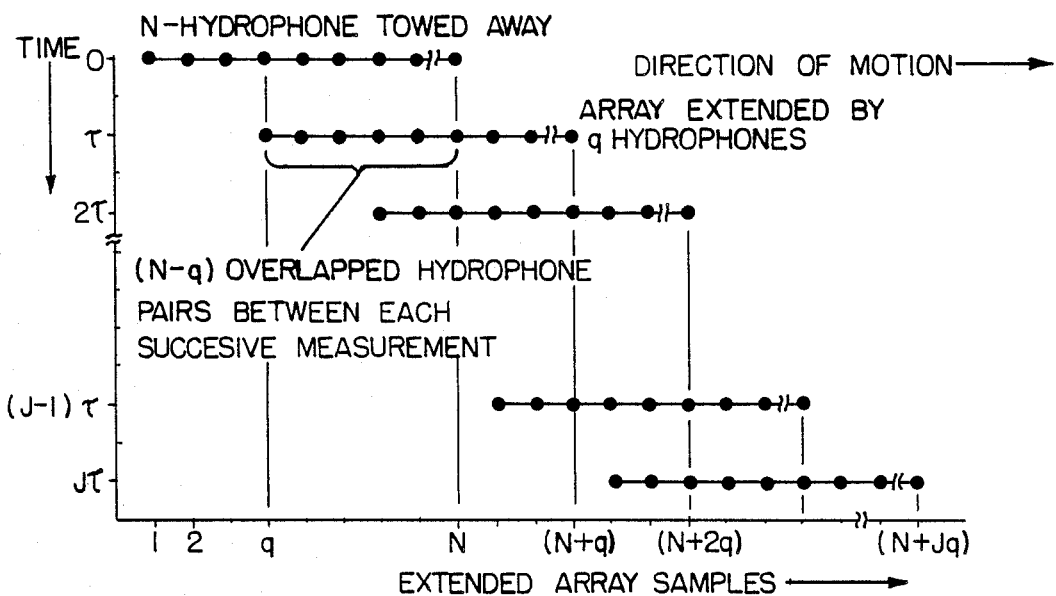
FIG. 2 shows a sequential, time versus position graph for a moving N element array of FIG. 1.

Referring now to FIG. 2 there is shown a graphical depiction of the relative positions of a moving N element towed array over a period of time. Assume "v" to be the speed of the tower array moving along a straight line course. At time $t = 0$, the acoustic pressure field is sampled using the receiving N-element towed array. At time $t = \tau$ another set of N-hydrophone measurements is taken of the acoustic pressure field, while the array has moved a distance $\tau V$. By proper choice of parameters $\tau$ and v we have $\tau V = qd$, where "q" represents the number of hydrophone positions that the towed array has moved and "d" represents physical hydrophone spacing. The acoustic pressure field for the $n^{th}$ hydrophone and for the $l^{th}$ set of measurements is $y_{nl}^l(r_{nl}, t_{il})$, where $r_{nl}$ is the position of this hydrophone at the $t_{il}$ moment, and where $i = 1, \ldots, M$ and M is the number of time samples for each hydrophone time series and $l = 0, 1, \ldots, J$. Then the position of the $n_{th}$ hydrophone is given by $r_{nl} = (lq + (n-1))d$, for $n = 1, 2, \ldots, N$.

As shown in FIG. 2, between two successive sets of measurements $(l, l+1)$ there are $(N-q)$ samples of the acoustic pressure field that represent the same position in space but differ by the factor $exp(j\omega\tau + \Phi)$.

The phase $\Phi$ represents systematic or random effects due to physical processes, which were discussed in our paper cited above. Hence, for this set of samples, the acoustic pressure field at the time moment $t_{il}$ is:

$$y_{nl}^l(r_{nl}, t_{il}), \quad (2)$$

where $n_l = q+1, q+2, \ldots, N$. At time moment $t_{il+1}$ it is, $$y_{nl+1}^{l+1}(r_{nl+1}, t_{il+1}) = exp(-j(\omega\tau + \Phi^l)) y_{nl}^l(r_{nl}, t_{il}) \quad (3)$$

where $n_{l+1} = 1, 2, \ldots, N-q$.

The phase term that includes all the effects due to the delay time and movement of the receiving array is given by:

$$\Psi_y^l = arg[Y_{nl}^l(r_{nl}, t_{il}) Y_{nl+1}^{+ \ l+1}(r_{nl+1}, t_{il+1})]_y \quad (4)$$

where $y = 1, 2, \ldots, N-q$ and $+$ denotes the complex conjugate. From equation (4), an estimate of the $l^{th}$ phase correction factor is given by:

$$\bar{\Psi}^l = \quad (5)$$

$$arg\left[\frac{1}{N-q} \sum_{y=1}^{N-q} [Y_{l,nl}(r_{nl}, \omega_m) Y_{(l+1),nl+1}^+(r_{nl+1}, \omega_m)]_y\right] = \omega\tau + \breve{\Phi}^l$$

where $Y_{l,nl}(r_{nnl}, \omega_m)$ denotes the space sample of the hydrophone time series in the frequency domain at a frequency $\omega_m$ of interest. Therefore, the $y_{nl}^l(r_{nl}, t_{il})$ for $n = 1, 2, \ldots, N$ samples of the acoustic pressure field could be extended by q more samples, based on the modification of the next set of measurements. as follows:

$$y_{nl}^l(r_{nl}, t_{il}) = exp(j\widetilde{\Psi}^l) y_{nl+1}^{l+1}(r_{nl+}, t_{il+1}) \quad (6)$$

where: $n_l = N+1, N+2, \ldots, N+q$, $n_{l+1} = N-q+1, N-q+2, \ldots, N$, $n_l$ being the index for the hydrophones of the $l^{th}$ set of measurements and $n_{l+1}$ being for the $(l+1)^{th}$ next set of measurements.

In the same way the first set of N samples of the N-element receiving array could be extended during the integration period $T=J\tau$ by (Jg) measurements so that the total number of space samples is N+Jq, which could be a preselected desired number. Then the integration period of the extended towed array processing, T, is given by $T=J\tau$ and $l=1, 2, \ldots, J$ is the index for each set of measurements.

Figure 3:
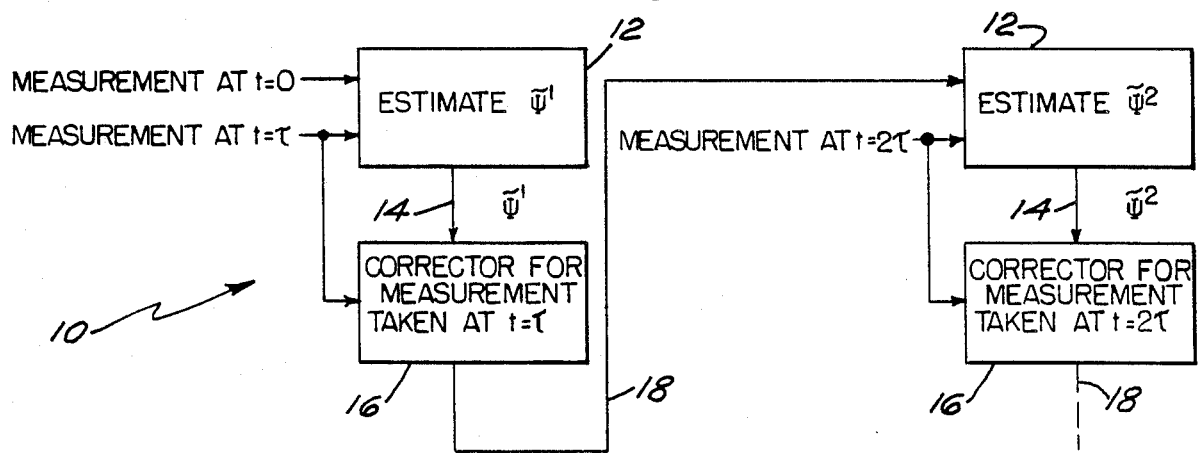
FIG. 3 shows a block diagram depicting the sequential phase correction factor generation means of the present invention.

FIG. 3 shows a block diagram depicting the function of the estimated phase corrector 10 during the extension of the physical aperture of an array. A first set of measurements is made at time $t=0$. A second set of measurements is taken at time $t=\tau$. Both sets of data are inputted into a phase estimator 12 to produce phase correction factor $\Psi^1$ as output 14 thereof. Output 14 and the measurements taken at $\tau$ are provided as input to corrector 16 which applies the phase correction factor to the data and produces corrected output measurements set 18 therefrom. Set 18 then is used as one of the inputs to a second phase estimator 12 along with a new set of measurements taken at time $2\tau$ to produce phase correction factor $\Psi^2$. The process continues for as many sets of data as desired.

FIG. 4 shows an overlap correlator synthetic aperture processing system 100. System 100 comprises a spectrum analyzer 102 adapted to receive a plurality of digital time series inputs 104 from an array of hydrophones. Each such plurality of inputs represents a set of sensed acoustic pressure field values produced by the hydrophones at a preselected instant of time. Multiple sets of such pressure field values are taken over time. Spectrum analyzer 102 receives each sequential set of inputs and outputs a corresponding plurality of frequency domain signal outputs 106 which are then provided as input to a plurality of data buffers 108, one each buffer for each set of sample values. The data from the first data buffer 108 is provided as input 110 to overlap correlator 12 and as input 112 to a corresponding first register 114. The data from the second data buffer 108 is provided as a second input 110 to overlap correlator 12, at which point correlator 12 employs the first and second sets of data to produce first phase correction factor $\overline{\Psi}^1$ which is then outputted over phase corrector bus 116 and provided as input 14 to the first of a plurality of correctors 16. This corrector 16 also receives the data from the second data buffer and applies phase correction factor $\overline{\Psi}^1$ to the second set of data producing corrected data output 118 as input to second register 114. This sequence of phase correction factor generation and data correction continues for as many sets of hydrophone samples as were chosen. It is noted that it is not necessary to have a buffer for each set of data values nor a plurality of corresponding correctors. Instead, two buffers and one corrector may be used along with a controller (not shown) which clears buffer 1, loads the data from buffer 2 into buffer 1 and then loads a new set of data values into buffer 2. Each correction factor is then applied by the single corrector. The controller stores the corrected data in the appropriate register. At that point the total extended data set in registers 114 is transmitted by beamforming electronics 120 for further processing.

When idealized parameters are assumed and the phase term $\Phi$ is due to random effects and has zero means, (i.e. $\overline{\Phi}^1=0$), the expected value of the phase correction factor in equation (5) is:

$$\overline{\Psi}(\omega\tau)=\omega\tau \qquad (7)$$

The above is the expression for the phase correction factor used by synthetic aperture techniques which require accurate estimates of $\omega$ or a maneuver coupled with very small random variation in $\Phi$ with zero means in order to derive estimates of $\omega\tau$. Where the random variations in $\Phi$ do not have zero mean the synthetic aperture techniques degrade badly, while for the ETAM algorithm there is not any such degradation. For example let us consider a case with a tow speed of 4 meters/sec and a hydrophone spacing "d" of 4 meters. The minimum time required between two successive set measurements in order to synthesize one hydrophone position is then 1 second. At a frequency of 200 Hz, 200 cycles will occur between each set of measurements. Thus, to have a phase accuracy of less than a quarter of a wavelength, the frequency must be known to an order of 0.1 percent. In most cases of towed array bearing estimation however, the source frequency is not well known. This invention avoids this problem by using a towed array of several hydrophones instead of a single hydrophone in a synthetic aperture scheme where the finite aperture of the array is exploited by a scheme that directly estimates the phase correction factor.

Figure 5:
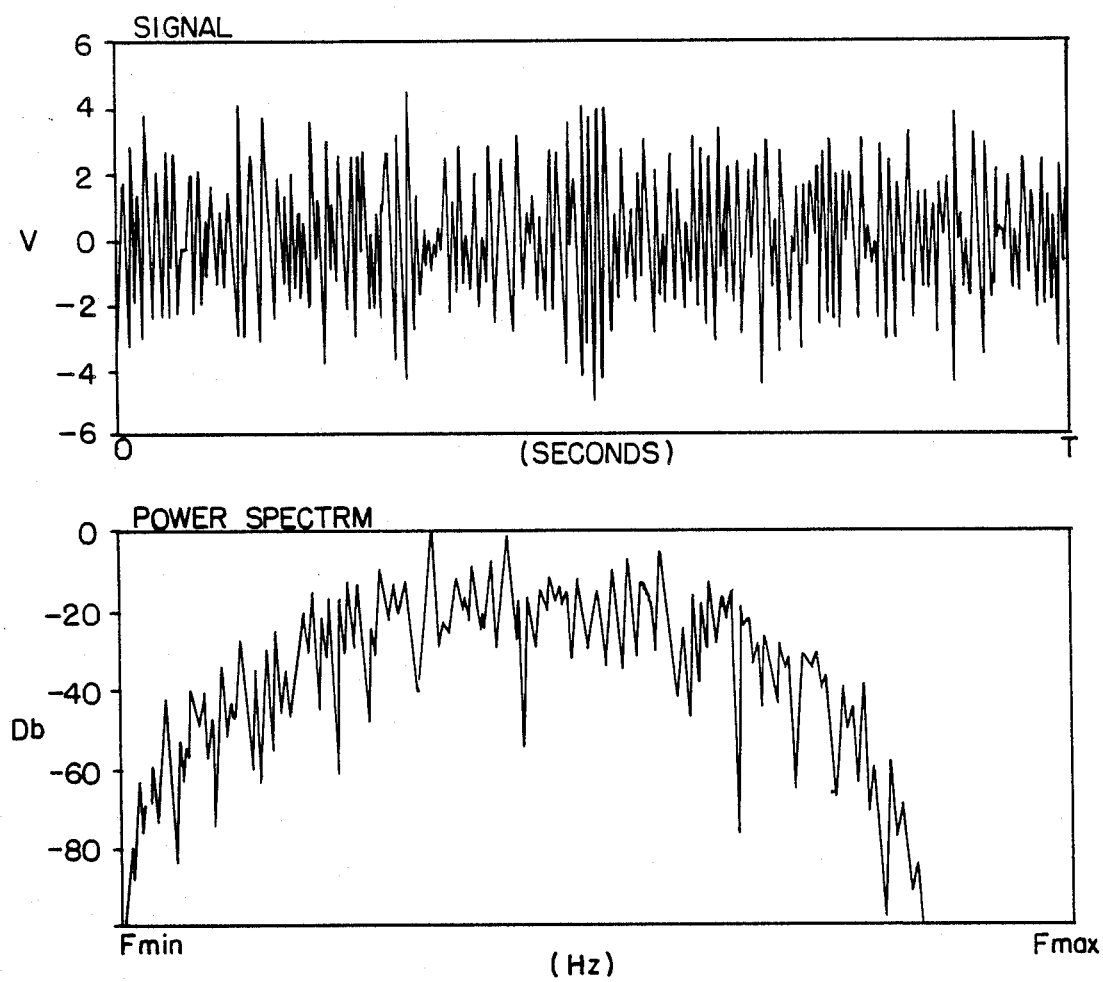
FIG. 5 shows a typical record of a hydrophone time series including both a broad band signal and the associated power spectrum.
Figure 6:
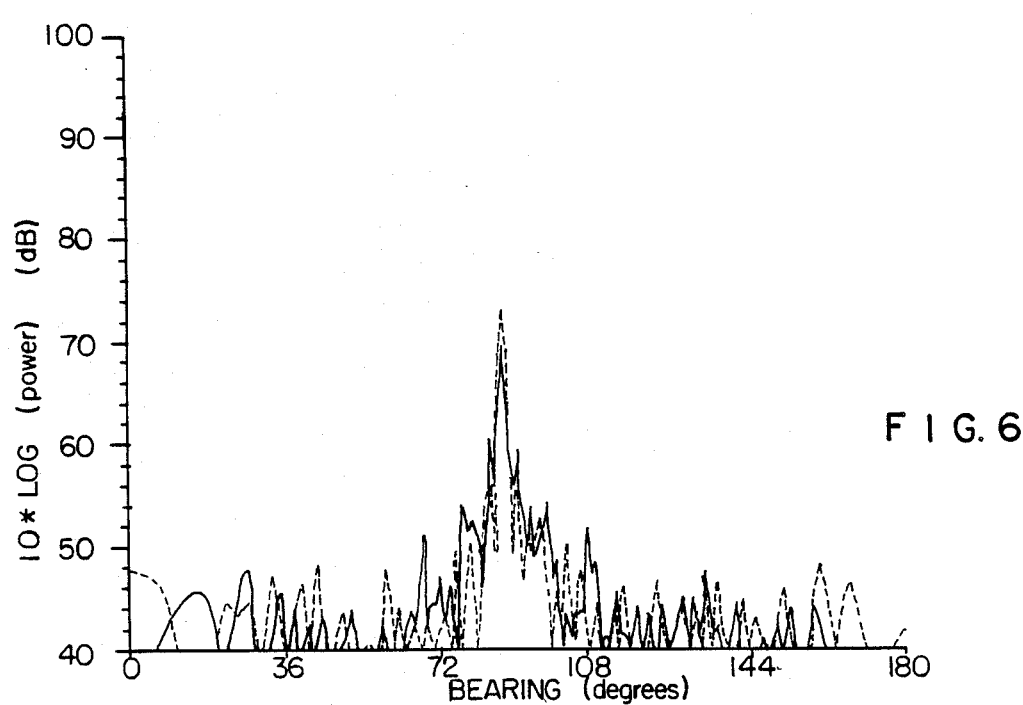
FIG. 6 shows the bearing estimate of a vessel which is obtained from the beamforming of 64 synthesized hydrophones derived from an 8 hydrophone array by using the ETAM algorithym, and for comparison, the bearing estimate from an actual 64 physical hydrophone array.

FIG. 5 shows a record of a hydrophone time series for the case of a vessel an acoustic source. The record includes the broad band signal and its power spectrum where the acoustic source is not active. Thus, the signal in this case is the broad band noise radiated by the ship when no source is present. The beamforming of a fully populated 64 hydrophone array for a time series sampling at a frequency bin near 750 Hz is given by the dashed curve of FIG. 6. The bearing estimate in this curve was in agreement with the expected bearing of the tow vessel. The beamforming of the above 64 space samples at any other frequency in the range (700-750) Hz provides similar bearing estimates indicating that the received signal is broad band and originates from the tow vessel. The solid curve of FIG. 6 shows the bearing estimate from a synthesized 64 hydrophone array derived from using only 8 hydrophones of the 64 hydrophone array in combination with the ETAM algorithm. The bearing results in the above two curves are nearly identical.

FIG. 7 shows the bearing estimate of the above described vessel as the solid curve, the curve being obtained from using the ETAM algorithm to beamform an array of 512 synthesized hydrophones in conjunction with a segment of 32 hydrophones of the 64 hydrophones receiving array. For comparison purposes, the bearing estimate from the actual 64 hydrophones array is also shown by the dashed curve of FIG. 7. The frequency bin used for beamforming for all the cases presented in FIGS. 6 and 7 was the same.

The power levels of the bearing estimate of FIGS. 6 and 7 indicate that the extended physical aperture using the ETAM algorithm has exploited the available space and time coherence of the underwater environment. If there were no phase variations in the received signal, then the standard synthetic aperture technique would also coherently synthesize an extended aperture. For this set of data, however, measurements taken show that the phase variations in the received signal for this particular underwater environment had a continuous drift of about $8\pi$ radians during 16 seconds of observation period. The standard synthetic aperture technique therefore would not provide coherent synthesis for an extended aperture for this set of data. This is demonstrated by FIG. 8 where the solid curve shows the beamforming of 64 synthesized hydrophones derived from an 8 hydrophone segment of the 64 hydrophone receiving array using the standard synthetic aperture technique. For comparison, the beamforming of the actual 64 hydrophone is shown by the dashed curve in FIG. 8. The incoherent synthesis of the 64 hydrophones in this case is shown by the power levels in the bearing estimates between the two curves. This incoherent synthesis is also shown by the failure to determine the bearing of the source in solid curve of FIG. 8.

The advantages and new features of this invention are as follows: The key concept of this invention is the successive measurement of hydrophone signals of a towed array that overlap. There is thus no need to have a highly accurate estimate of the source frequency or to perform a maneuver with the towed array as required in the usual synthetic aperture techniques since the spatial overlapping permits proper compensation for phase fluctuations of the received signal caused by irregularities of the tow path of the towed array and the acoustic propagation characteristics. In addition, the phase term $\Phi$ in equation (5) can be of any size having a non-zero mean, while for the usual synthetic aperture techniques what would be required is that $\Phi$ have a zero mean and very small random variations in addition to having accurate estimates of the source frequency. Also, the overlap processor significantly outperforms the previous synthetic aperture technique. The invention increases the length of useful aperture of a towed array far beyond the physical aperture. Experimental results have indicated that the ETAM algorithm of this invention extends the physical aperture of a towed array more than 16 times. These test results were for CW received signals and for broadband radiated noise of ships. The component of the source speed along its bearing was about 4 knots. The ETAM computation is accomplished using a simple and fast algorithm. In cases where the variations of the phase term $\Phi^l(t)$ in equation (5) are systematic, as in the case of FM variation in a received signal, the ETAM algorithm can be modified to compensate that and this is described in our above cited paper. Additionally, the ETAM algorithm of this invention provides a direct estimate of the phase correction factor $\Psi$ without a highly accurate knowledge of the source frequency and its performance is equivalent to that of a Maximum Likelihood Estimator (MLE) thereby making it an optimum estimator. The performance of both estimators (i.e. ETAM, MLE) achieves the theoretical Cramer-Rao Lower Bounds and they start to degrade for received signals having a signal to noise ratio below zero dB at the hydrophone (or $-8$ dB re 1 Hz Band). In other words this algorithm has very good performance even for received signals having very low SNR.

What has thus been described is a means for extending the useful aperture (length) of a towed array by using the overlap of the successive positions of the array as it moves forward to compute the phase corrections for a synthetic aperture scheme. A plurality of phase correction factor estimators continue to refine the correction factor using later in time measurements.

Obviously many modifications and variations of the present invention may become apparent in light of the above teachings. For example: An alternative would be to compute a multi-variate estimate of the bearing and frequency directly using a Maximum Likelihood Estimator, but this would be extremely time consuming and would require an extremely large memory space since it constitutes a nonlinear problem to which a closed solution does not exist. This invention also applies to wide aperture type arrays with general geometry configurations.

In light of the above, it is therefore understood that within the scope of the appended claims, the invention may be practiced otherwise than as specifically described.

What is claimed is:

1. A passive acoustic signal processing apparatus, comprising:

a N element physical hydrophone towed acoustic array, said array having a leading end, a trailing end and further being in motion at a preselected velocity; and signal processing means, electrically connected to said N element moving towed array, for receiving $J+1$ sequential sets of N time sampled electrical signals from said N physical hydrophones of said towed array, the sampling time period $\tau$ being preselected such that said array has moved a distance equal to "q" hydrophone positions and therefore each signal set having the trailing $N-q$ hydrophones of said N element array spatially overlapping the position previously occupied by the leading $N-q$ hydrophones of said N element array during the previous measurement thus exploiting the N element finite physical aperture of the array in order to provide a direct estimate of a phase correction factor, and producing J such phase correction factors from said $J+1$ measurements, said J phase correction factors then being applied to correct said measurements so as to provide N physical hydrophone outputs plus Jq synthetic hydrophone outputs therefrom;

said signal processing means thereby providing a towed array having an effective aperture $N+Jq$ which is substantially longer than the physical aperture N of said towed array.

2. An apparatus according to claim 1 wherein said signal processing means further comprises:

a spectrum analyzer, adapted to receive said $J+1$ sets of N each digitized time series inputs from said array of N hydrophones, each said set of N inputs representing sensed acoustic pressure field values produced by said N hydrophones at said sequential, preselected instants of time $\tau$, said spectrum analyzer outputting a corresponding plurality of sequential frequency domain signal output data sets;

a first data buffer, connected to said spectrum analyzer, for receiving and storing the first set of data values;

data buffer means, connected to said spectrum analyzer, for receiving and storing the second through $J+1$th set of data values;

an overlap correlator, connected to said first data buffer and said data buffer means, for receiving said $J+1$ sets of data, said correlator successively processing sequential sets of N data values each in such a way as to produce said J phase correction factors;

a phase corrector bus, connected to said overlap correlator, for receiving and transmitting said plurality of phase correction factors;

data corrector means, connected to said phase corrector bus and also to said data buffer means, for receiving the data from said data buffer means and applying the appropriate phase correction factor to the corresponding set of data thereby producing a corrected sequence of data outputs therefrom;
a plurality of J+1 data registers, the first data register being connected to said first data buffer and said remaining data registers being connected to said data corrector means, for receiving and sequentially storing said J+1 sets of corrected data;
beamforming electronics, connected to each of said plurality of registers, for receiving said data from said plurality of registers and producing a beam pattern therefrom.

3. An apparatus according to claim 2 wherein:
said data buffer means further comprises a plurality of data buffers, each connected to said spectrum analyzer and to said overlap correlator, for receiving and storing the second through Jth set of said data values; and
said data corrector means further comprises a plurality of data correctors, each data corrector being connected to said phase corrector bus and one each data corrector also being connected to one of said second through Jth data buffers, for receiving the data from said corresponding data buffer and applying the appropriate phase correction factor to the corresponding set of data thereby producing a corrected data output therefrom.

* * * * *